United States Patent [19]

Diffenderfer et al.

[11] Patent Number: 4,622,840

[45] Date of Patent: Nov. 18, 1986

[54] METHOD FOR DRAWING TELESCOPING TUBES FOR TORQUE TRANSMISSION

[75] Inventors: Harold R. Diffenderfer; George S. Rowley, both of Pottstown, Pa.

[73] Assignee: Neapco, Inc., Pottstown, Pa.

[21] Appl. No.: 755,669

[22] Filed: Jul. 16, 1985

Related U.S. Application Data

[62] Division of Ser. No. 505,770, Jun. 20, 1983, abandoned.

[51] Int. Cl.⁴ ............................................. B21C 1/24
[52] U.S. Cl. ....................................... 72/283; 72/370; 72/276
[58] Field of Search ............... 72/283, 276, 278, 282, 72/274, 370; 464/162, 172, 179, 183

[56] References Cited

U.S. PATENT DOCUMENTS

| | | | |
|---|---|---|---|
| 1,025,568 | 5/1912 | Higgin | 72/283 |
| 3,293,884 | 12/1966 | Grob . | |
| 3,630,062 | 12/1971 | Odaki et al. | 72/283 |
| 3,744,290 | 7/1973 | Sirois | 72/283 |
| 3,805,552 | 4/1974 | Heald | 464/162 |
| 4,125,000 | 11/1978 | Grob . | |

FOREIGN PATENT DOCUMENTS

| | | | |
|---|---|---|---|
| 2010066 | 9/1971 | Fed. Rep. of Germany . | |
| 1331015 | 5/1963 | France | 72/370 |
| 625409 | 9/1961 | Italy . | |
| 100912 | 6/1983 | Japan | 72/283 |
| 839155 | 6/1960 | United Kingdom | 464/183 |
| 876593 | 9/1961 | United Kingdom | 464/172 |
| 881355 | 11/1961 | United Kingdom | 464/162 |

Primary Examiner—Daniel C. Crane
Attorney, Agent, or Firm—Woodcock Washburn Kurtz Mackiewicz & Norris

[57] ABSTRACT

An improved telescoping torque transmitting connection and a method for making tubes used in the formation of this connection are disclosed. The tubes are formed with inwardly extending lobes and the lobes are formed so that the wall thickness of the tube in their vicinity is at least as great as it is in the remainder of the tube, whereby the strength of the tube is not reduced by formation of the lobes. The lobes are formed with substantially flat flanks for interaction with the lobes of the mating tube, whereby the contact between the two tubes is made at a plurality of planar surfaces rather than along a plurality of lines so that the end loading developed when the tubes are telescoped with respect to one another under load is not excessive. The method for making the tubes involves drawing a precursor tube to an intermediate precursor having non-uniform wall thickness, in which the wall thickness of the tube is increased in the vicinity of the lobes to be formed, so that the wall thickness of the eventually-formed lobes is at least as great as that of the tube in the areas not having the lobes formed therein.

12 Claims, 11 Drawing Figures

METHOD FOR DRAWING TELESCOPING TUBES FOR TORQUE TRANSMISSION

This is a division, of application Ser. No. 505,770, filed June 20, 1983 abandoned.

FIELD OF THE INVENTION

This invention relates to telescoping shafts for the transmission of torque. More particularly, the invention relates to telescoping tubes which are formed to have mating cross-sectional shapes so that torque can be transmitted from one tube to the other.

BACKGROUND OF THE INVENTION

There are many industrial applications for telescoping torque transmitting joints. An example is in agriculture where typically a tractor is used to tow an implement which is powered by the engine of the tractor. Torque is transmitted from the tractor to the implement by a shaft. The shaft is typically connected to both the tractor and the implement by "U" or "Cardan" joints, which permit flexing of the connection between the tractor and the implement so as to enable it to go around curves. Usually the geometry of the drive shaft with respect to the towbar connection is such that there must additionally be a telescoping connection somewhere in the drive line connecting the tractor to the implement.

The prior art has typically made such telescoping connections with a U-joint yoke attached to a sleeve with a rectangular or square internal shape which is engaged by a solid shaft attached to the yoke of the other U-joint. The shaft slides within the sleeve to provide the telescoping action necessary for operation.

Many types of telescoping elements have been used in this application but the industry is continually looking for a telescoping torque transmitting connection which will provide minimal end loading while telescoping under load, with simplicity of design, and the lowest cost possible consistent with good service life expectancy.

The assignee of the present invention has filed a co-pending case, U.S. Ser. No. 313,202 filed Oct. 20, 1981 in which a square tube slides longitudinally in a square orifice formed in a billet as described above. The interacting square shapes provide torque transmission, while the difficulty of high end loading, resisting telescoping, is overcome by fitting anti-friction members or coatings on the mating members. This approach, while workable, suffers from the fact that a relatively large number of parts must be manufactured at undesirably high cost. Accordingly, this approach is not as cost-effective as might be desired.

Several attempts have been made in the prior art to simplify the design of telescoping torque transmitting shafts. Three different prior art approaches will be discussed below in connection with FIGS. 3 through 5. Basically, all those prior art approaches involve deformation of inner and outer tubes which telescope. The deformations are formed in such a way that torque can be transmitted from one of the tubes to the other. This reduces the number of parts required. However, the prior art telescoping deformed tube designs all suffer from at least one of a variety of shortcomings. Some require excessively large mating yoke members, while others, if required to be telescoped while transmitting torque, generate substantial end loading. It is therefore evident that a need exists in the art for an improved telescoping torque transmitting member.

OBJECTS OF THE INVENTION

It is a primary object of the invention to provide an improved torque transmitting member with high torque carrying capability, low end loading when telescoped under load, and which is manufacturable at reasonable cost.

It is a further object of the invention to provide a deformed-tube, telescoping torque transmitting connection which while relatively inexpensive to manufacture, has high torque carrying capability and which can be telescoped upon application of a reasonable force, even while under load.

It is a further object of the invention to provide a deformed-tube, telescoping torque transmitting joint design in which the basic cylindrical shape of the tube is deformed as little as possible, to enable ready connection to cylindrical bores in U-joint yokes and the like, and to simplify manufacture.

It is a further object of the invention to provide a deformed-tube, telescoping torque-transmitting connection in which the two members will only fit together in one relative alignment so as to ensure proper phasing of related devices, such as the yokes of associated U-joints.

It is a further object of the invention to provide a deformed-tube, telescoping torque-transmitting joint in which both members are of roughly equal strength.

SUMMARY OF THE INVENTION

The above needs of the art and objects of the invention are satisfied by the telescoping torque transmitting joint of the present invention, in the preferred embodiment of which two round tubes are each formed to have three longitudinally-extending, inwardly-facing vee-shaped grooves or lobes. The inner surfaces of the grooves formed on the outer tube interact with the outer surface of the grooves formed on the inner tube. The mating areas are substantially flat longitudinally extending surfaces, so that torque is transmitted by flat-to-flat surface engagement, as compared with the essentially linear contact surfaces found in some prior art deformed-tube joint designs. In this way, the relative surface area over which the torque is transmitted is greatly increased so that the specific frictional loading per unit area is reduced, thus enabling the end loading caused by telescoping of one tube with respect to the other to be much reduced over the prior art, to a point that the end loads are quite reasonable. In the preferred embodiment, the mating faces of the inner and outer grooves are at about 45° to the diameter of the tube and are symmetrical about the diameter so that torque can be transmitted equally well in both directions.

BRIEF DESCRIPTION OF THE DRAWINGS

The invention will be better understood if reference is made to the accompanying drawings, in which:

FIG. 6 shows how the telescoping tubes according to the invention can readily be attached to a U-joint yoke or the like;

FIG. 9, comprising

DESCRIPTION OF THE PREFERRED EMBODIMENTS

Figure 1:
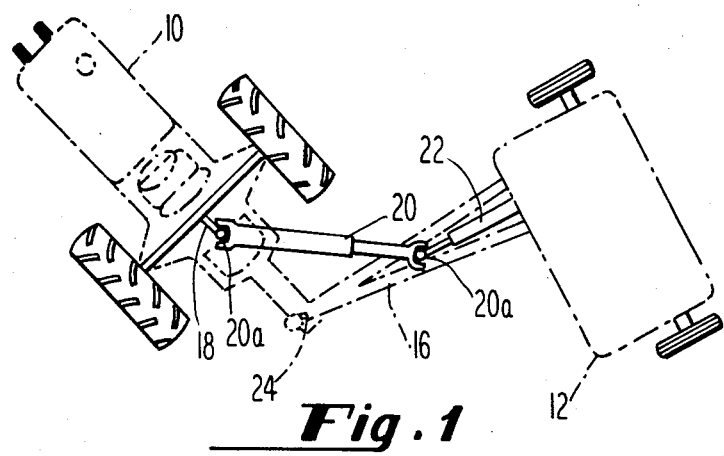
FIG. 1 shows a drive shaft formed using the torque transmitting coupling according to the invention interposed between a tractor and a towed and powered implement, showing the necessity of telescoping in such a drive shaft.

As discussed above, it is frequently necessary in agricultural applications, such as towing a powered implement by tractor and transmitting power to the implement via a torque transmitting member coupled to a power take-off (PTO) shaft at the rear of the tractor, that the shaft be telescoping to compensate for variation of the distance between the PTO shaft and the implement's driven shaft, as the combination of tractor and powered implement traverses curves. This is shown in FIG. 1 in which a tractor 10 tows a powered implement 12 such as a haybaler or the like. The tow connection is made by way of a tow bar 14 attached to a trailing link 16 on the powered implement 12. Power is transmitted from a PTO shaft 18 on the tractor 10 via a telescoping drive shaft 20 according to the invention, to the driven shaft 22 of the powered implement. As shown, the pivot points of the universal joints 20a which allow the tractor to turn relative to the powered implement 12 are not coaxial with the pivot 24 connecting the tow bar 14 with the trailing link 16. Accordingly, a telescoping joint must be provided in the drive shaft 20.

Figure 3:
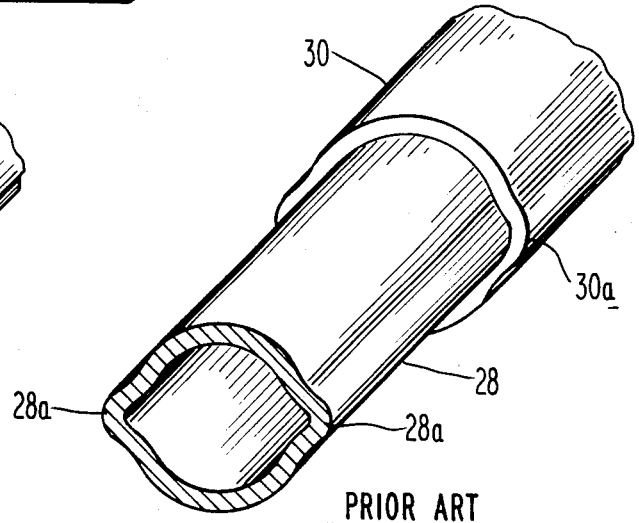
FIGS. 3, 4 and 5 show comparable perspective views of several prior art joints.
Figure 4:
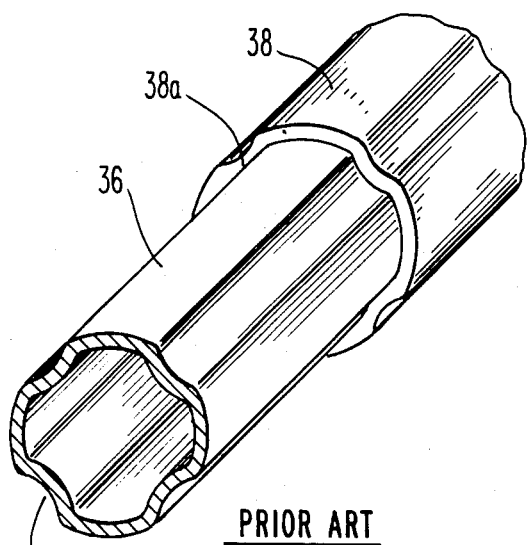
Figure 5:
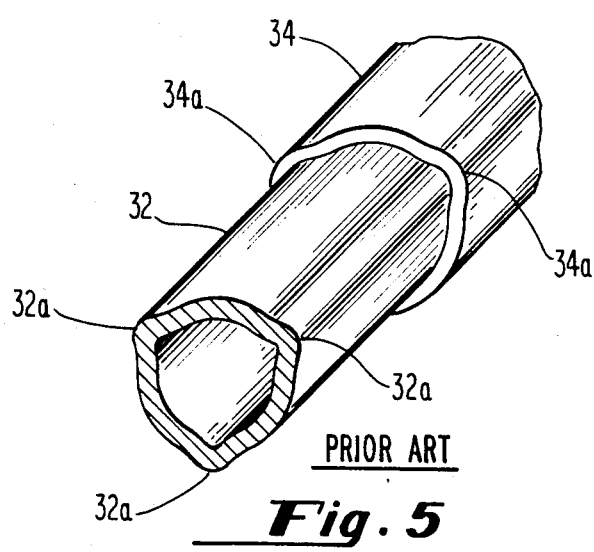

As discussed above, the prior art has most commonly made these telescoping joints by using a square or rectangular male member fitting within a correspondingly shaped mating female member. This connection is of great utility and popularity throughout the industry. However, this structure is relatively expensive because a large number of parts are required. Accordingly, the art has sought to achieve a less expensive telescoping torque transmitting connection; FIGS. 3 through 5 to be discussed hereafter show several such attempts, none of which are entirely satisfactory.

For example, FIG. 3 shows a telescoping torque transmitting member sold by the Jean Walterscheid Company of West Germany and referred to colloquially as "lemon tubing." As shown, generally cylindrical inner and outer tubes 28 and 30 respectively are deformed to have mating, outwardly extending lobes 28a on the smaller male member 28 and 30a on the larger female member 30.

The surfaces of the lobes 28a and 30a which contact one another to transmit torque are generally planar. This results in areal contact of the two tubes under load, so that low friction per unit area is encountered, which permits telescoping under load without undue end loading. However, this design has several significant defects. One is that the outward shape of the lobes makes it very difficult to straighten such tubes using techniques presently available in this country. Since straight tubes are crucial to the telescoping capability, and since some twist is commonly considered inevitable in the forming process, this is a serious drawback. Another difficulty intrinsic in the Walterscheid design shown in FIG. 3 is that the outwardly extending lobes require that a corresponding hole be formed in the mating part, such as a U-joint yoke or the like. Formation of a symmetrical round hole would be much simpler. Likewise, the yoke must be much bigger overall than if the tube had a simple circular cross-section. Also, the relatively large size of the lobes means that the tube shape departs substantially from the circular, which reduces its strength substantially (circular tubes having the highest torsional rigidity of any tube design of comparable cross-section.)

Another approach is shown in FIG. 5 in which an inner member 32 and an outer member 34 have three outwardly-extending lobes formed on each, 32a and 34a, respectively. This tubing is sold by the Bondioli and Pavesi Company of Italy and appears to be shown generally in Italian Pat. No. 625,409, although translation of the claims of that patent reveals that the invention there appears to have been considered the particular cover used to protect operators from being caught in the spinning drive shaft. The Bondioli and Pavesi design shown in FIG. 5 has the same deficiencies as that shown in FIG. 3, namely that the outwardly extending lobes prevent straightening by conventional processes, require the formation of irregularly-shaped holes in mating members, require the mating members be of larger size than if the tubes were circular, and are so big as to substantially reduce the torsional rigidity of the tube as compared with a circular tube.

The commercially sold version of the Bondioli and Pavesi joint does exhibit flat interaction surfaces, and has the useful feature that the lobes on the inner and outer tubes are not spaced equally from one another, so that the two tubes only fit together in one way; that is, one of the lobes 32a fits only within a corresponding one of the lobes 34a, and so on. This is useful in the drive shaft environment because it is essential that the axes of the U-joint yokes attached to the inner and outer telescoping tubes 32 and 34 be correctly aligned with respect to one another, so that the U-joints at either end of the telescoping tubes are "in phase" with one another.

Another prior art approach is shown in FIG. 4. Here, the lobes are formed inwardly as at 36a on the inner tube 36 and at 38a on the outer tube 38. This inward deformation has one advantage, namely that it is relatively simple to install these tubes in a round hole which can be formed in a U-joint yoke or the like by relatively economical methods such as drilling. By comparison, if the tube is to be inserted into a mating hole for assembly, the outward departure of the lobes of the tube section shown in FIGS. 3 and 5 from the circular requires the formation of a correspondingly-shaped non-round holes which is much more complicated and hence expensive to form in any connecting member. However, the tube design shown in FIG. 4 does not satisfy the needs of the art, as it has rounded lobes providing only linear contact. The resultant high frictional loadings lead to high end thrust loads when the tractor/driven implement assembly undergoes a turn. Moreover, the lobes shown in the FIG. 4 tube are rather large, meaning that minimal non-deformed surface area is available to attach the tubing to a circular hole in a U-joint yoke or the like, for example, by welding or by adhesives, and so that the torsional rigidity is significantly lowered as compared with a round tube.

Figure 2:
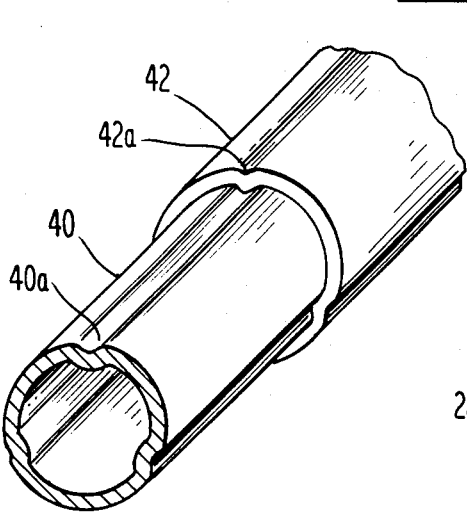
FIG. 2 shows a perspective view of the coupling according to the invention.

FIG. 2 shows a corresponding view of the telescoping torque transmitting members according to the invention. Again, an inner tube 40 fits within an outer tube 42 and correspondingly shaped inwardly extending lobes 40a and 42a, respectively, interact to provide the torque transmitting capability. However, in this case it should be appreciated that in cross-section, the faces of the lobes which transmit the torque are not entirely rounded, but comprise flat segments. This will be shown in more detail in Figures discussed below. Suffice it at the moment to say that flat surfaces are provided to give a planar interaction surface for torque transmission. This greatly increases the area over which the torque is transmitted, as compared with the linear contact made by the rounded lobes according to the prior art embodiment shown in FIG. 4, and greatly reduces the specific friction and hence the end loading which occurs upon the tractor and drawn implement taking a curve under load.

Figure 6:
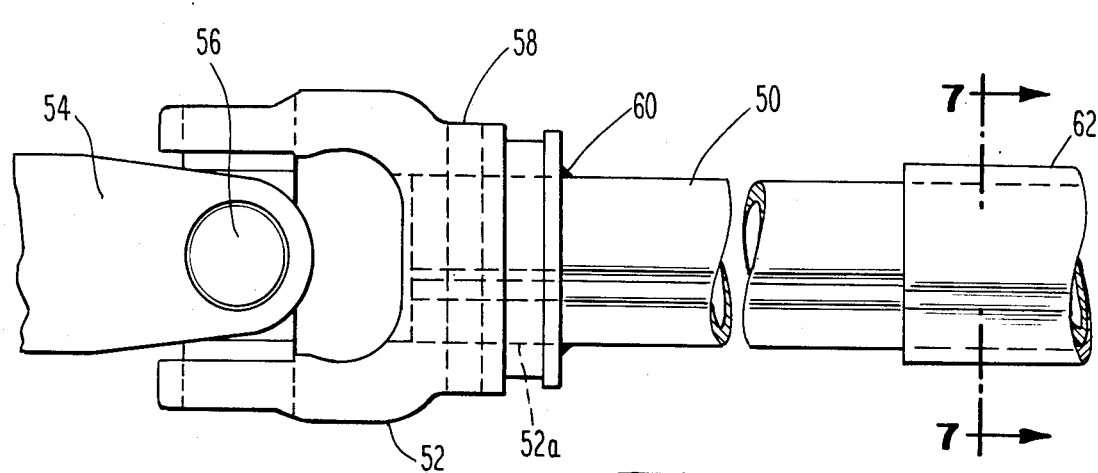

FIG. 6 shows how the tube of the invention may readily be connected to a U-joint yoke or the like. A section of the tube 50 is inserted within a generally round hole 52a formed in a U-joint member 52 or the like. It in turn is connected to another U-joint member 54 by way of a cruciform bearing member 56, all in accordance with the prior art practice. The tube 50 may be secured to the U-joint member 52 by means of a pin fitting through a cross-hole 58, by welding around its periphery as at 60, or by adhesives, if the joint is made sufficiently close fitting, or by as combinations of these, or by other means. In this connection it is to be noted that the rounded shape of the tube according to the invention is much more complete than that shown in the prior art device shown in FIG. 4 such that adhesives might actually be adequate to form the connection, particularly if reinforced with the pin such as at 58, thus further simplifying the manufacture of drive shafts according to the present invention. In some cases the applicants have found that it is not necessary that inward splines be formed to mate with the grooves in the tube, so that a simple round bore in the yoke is adequate, which serves further to simplify manufacture of the yoke.

Figure 7:
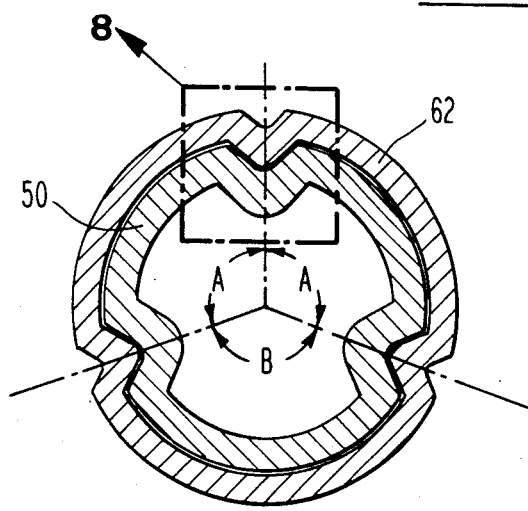
FIG. 7 is a cross section taken along the line 7—7 of FIG. 6.

FIG. 7 is a cross-sectional view taken along the line 7—7 of FIG. 6 and shows the fit between the two tubes 50 and 62 of FIG. 6. As will be observed the tolerances therebetween are quite close so that little or no tendency to "cocking" of the inner tube with respect to the outer is observed under load. This cocking is a serious problem in the prior art, and the way by which it is avoided according to the invention will be discussed in further detail below. One point to be observed from FIG. 7 is that the three lobes shown are not symmetrically disposed about the circumference of the tube. For example, angles A are formed between two pairs of lobes and a different angle B between the other pair. In the embodiment shown, the angles A are each equal to 110° and the angle B is equal to 140°. In this way, the tubes can only be assembled in one way, ensuring that the relative phasing of U-joint yokes as at 52 (FIG. 6) is correct, as is necessary for their proper operation.

Figure 8:
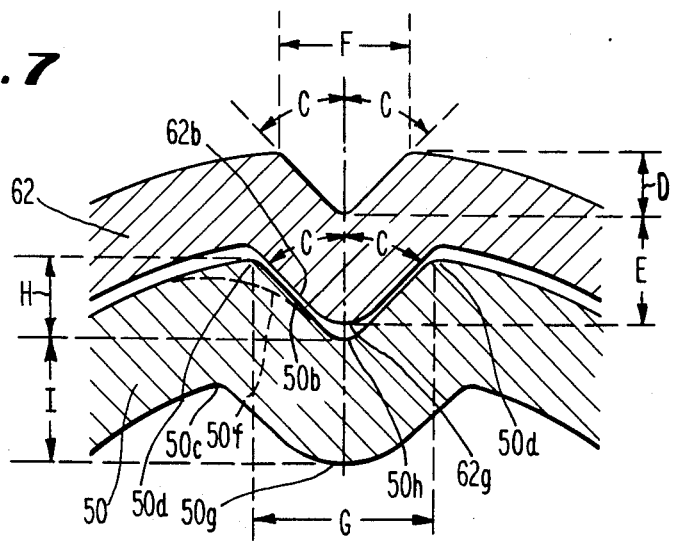
FIG. 8 is an enlargement of box 8 from FIG. 7, showing details of the construction of the inwardly extending lobes of the tubing of the invention.

The details of the interacting lobes will now be discussed with respect to FIG. 8 which is an enlarged view of the portion of FIG. 7 marked 8. It details one pair of lobes formed on an inner tube 50 and an outer tube 62. As shown, both lobes are symmetrical about a center line passing through the lobe, making the same angle with respect to the center line, which also passes through the center of the two tubes. In the preferred embodiment, the angles C formed on the inner and outer surfaces of both lobes are identical. In this way, the planar surfaces 50b and 62b, which are the torque transmitting surfaces, are ensured to mate correctly, so that planar contact is in fact made, so that the frictional force generated when the coupling is under load is spread out over a planar region, i.e., having the width of region 50b and length equal to length of the overlapping portion of the tubes, so that the tubes can be telescoped under load without undue end loads being generated.

There are several salient features to be discussed in connection with the lobe design of FIG. 8. One is that as mentioned the angles C formed by the lobe with respect to a diameter passing therethrough are equal on both sides of the diameter; that is, the lobe is symmetrical. This allows torque transmission in either direction. Another factor favoring symmetrical lobes, which will be more fully discussed below, relates generally to the difficulty of forming an asymmetrical lobe which would complicate the drawing process used to form the lobes according to the invention.

The overall dimensions and tolerances of the inner and outer tubes 50 and 62, respectively, are also significant in understanding the invention. In a preferred embodiment, the outer diameter of the outer tube 62 is 1.750 inches and has a wall thickness of 0.120, giving an inner diameter of 1.510 inches. The angles C are all 45°. The innermost portion of the lobes would have a diameter of 1.290 inches if they formed a continuous circle. The depth D of the groove defining the outer portion of the lobe is 0.072 inches, while the thickness E of the lobe at its center is 0.156 inches. The width F of the lobe measured at its outer points is 0.187 inches. Referring to the inner tube 50, its outer diameter is 1.480 inches and its inner diameter 1.158 inches. If the innermost portion of the cam lobe 50c formed a continuous circle, it would have a diameter of 0.910 inches. The width G of the outer groove of the lobe is equal to 0.220 inches, while the depth H of the groove is 0.109 inches and the thickness I of the lobe at its inner point is 0.167 inches.

Tubes having these dimensions and conforming to tolerances as follows: variation in OD: −0.010 inches, +0.000 inches; no more than 0.030" deviation from a straight edge in any three foot section; and no more than 1° twist per three foot section, have been manufactured of a so-called HSLA steel and yield a telescoping joint which performs satisfactorily according to ASAE category 4, having a nominal torque transmission rating of 50 hp at 540 rpm and 83 hp at 1000 rpm. It is found that both the inner and outer tubes, defined as above, had substantially equal torsional strength; about 22,750 to 23,000 in.lbs. was required to twist them to failure, defined in this connection to be a permanent deformation of more than 1° per foot.

As discussed above, in the preferred embodiment of the invention, the angle C, which defines the angles made by all the flat surfaces of the walls of the lobes with respect to a diameter passing through the centers of the lobe and of the tube, is 45°. These angles are made symmetrical, as discussed, for several reasons. Formation of a symmetrical groove imparts symmetrical stresses to the tube. This is very desirable because it limits the twist or curvature which might otherwise be imparted to the tube in forming. Straightening of tubes to the degree required for proper telescoping is a substantial task and is desirably avoided wherever possible. As noted above, it is also desirable that the torque transmitting capability of the connection be symmetrical, both for reasons of manufacturing simplicity as well as for operational reasons. To deform the tube in an asymmetrical fashion would require more total deformation, which would add manufacturing complication and would reduce the amount of round surface remaining after deformation. As noted, a cylinder is very resistant to twist, so that it is desirable to limit the deformation of this shape. Finally it is obviously desirable that a telescoping drive shaft designed to interact with the PTO shaft or other application be readily usable in either direction of rotation.

As discussed above, in the preferred embodiment, the included angle formed in the lobes formed inwardly in both the inner and outer tubes is 90°. It should be apparent to those skilled in the art that if the angle is increased too greatly from this figure, rotation of one tube with respect to the other will not lead to torque being effectively transmitted, but will instead tend to wedge one tube against the other in line contact, instead of contact over a planar surface, which would lead to jamming and excessive end loading upon telescoping. That is, in the case of an included angle much greater than 90°, if one resolves the vector perpendicular to the plane of intersection along which force is exerted by twisting one tube with respect to the other, the greater portion of the force tends to urge one plane along the mating face, instead of transmitting a torque from one tube to the other. Stated slightly differently, most of the force is directed parallel to the planes, not perpendicular thereto. On the other hand, if the angle were reduced substantially, the lobes would be much harder to form, for reasons which will be discussed in detail below, without offering any real performance improvement. Accordingly, and without representation that testing has been performed, it is believed that an included angle of between about 60° and about 120° would probably be workable in place of the 90° angle shown, and which is the angle of the preferred embodiment; that is, the angles C formed by each of the torque transmitting walls 50b and 62b with respect to a line passing through the center of the lobe and the diameter in the center of the tube can vary between about 30° and about 60° without departing from the principles of the invention.

Similarly, it is not possible to say with particularity what minimum width the planar contact areas 50b and 62b must have in order to provide an effective torque transmitting joint while not requiring excessive end loading for telescoping. In the embodiment shown and described in detail above, a minimum contact area about 0.060" wide results from application of the tolerances discussed, while if the manufacturing process were carried out such that all the parts were precisely to specification, the contact areas would be about 0.090" wide. The design shown and discussed in detail above has, of course, some margin of safety built into it, and it may be assumed, though again without representation that any objective testing has been performed, that a planar area of no more than about 0.020" might be adequate. Again, the point to be emphasized here is that the contact between inner and outer tubes is made by planar contact, not linear as was found in the prior art devices shown in FIG. 4, in which no planar surfaces were formed on the lobes, the lobes having instead a rounded cross-section. Accordingly, it appears that the gravamen of the present invention is provision of mating tubes, having inwardly extending grooves which form surfaces for the interaction of the inner and outer telescoping tubes, which surfaces have both a length and a width for the transmission of torque from one tube to the other, as opposed to a lobe design in which the intersections of the inner and outer tubes are substantially linear, i.e., had no width.

In this connection, however, note that the planar surfaces need not necessarily be flat, but could be curved; the point is that the surfaces must mate over some substantial portion of their cross-section, not merely touch at one or several points.

It will also be appreciated, of course, that the minimum width of the area of intersection of the two tubes will vary in accordance with the diameter of the tubes, as well as the class of service required of the joint made using the telescoping tubes.

Those skilled in the art will recognize that one primary difference between the telescoping tube torque transmitting members according to the invention and the prior art devices shown in FIGS. 3 through 5, and one which has not been discussed in great detail previously, is that in the joint of the invention, both inner and outer tubes are of non-uniform cross section while those in the prior art devices shown in FIGS. 3 through 5 are generally tubes of regular cross section (i.e., ordinary tubes) which have simply been deformed to form lobes, the wall thicknesses of which remain constant. By comparison, the tubes according to the invention have a thicker cross section in their portions in the vicinity of the lobes than they do in the remainder of the tube. This is necessitated to achieve the goals of having flat planar intersection surfaces for the lobes while keeping the lobes fairly small and inwardly directed; the lobes of the prior art devices of FIGS. 3 and 4 have flat surfaces, but are undesirably large and outwardly directed. The wall thickness of the tubes of the invention is at least equal in the vicinity of the grooves to that at other portions of the tubes, for strength, and is actually thicker measured across the three "bends" forming each lobe. To provide this nonuniform cross sectional tube does introduce some complexities in manufacturing, but these are deemed well worth the extra trouble they involve.

Referring now once again to FIG. 8 it will be observed that the surfaces 50b and 62b at which the intersection of the two tubes is made and by which the torque is transmitted are both defined by relatively sharp corners, e.g., the corners 50d between which the measurement G is made. Were these sharp corners 50d not present it would be impossible to form a flat intersection surface 50b in, for example, the inner tube 50. If the tubes were of uniform cross-section in this region, the sharp corners 50d would be rounded off as shown by the dotted line 50f, having an outer radius roughly equal to the thickness of the tube wall and centered on the inner vertex 50c of this curve. The same situation would be true of the corresponding curve on the right side of the lobe in the drawing, and of both the inwardly extending curves of the outer tube. As shown, the trough formed by the center of both lobes is shown with its inner surface more rounded than its outer. This is particularly noticeable with respect to the shape of the inner curve 50g of the groove formed in the inner tube 50. The corresponding curve 62g of the outer tube 62 is carefully made sharper so as to mate more fully with the inner curve of the central lobe 50h, again further ensuring that a substantially wide, flat planar interface 50b/62b is formed, and so that the cross section of the tube in the vicinity of the grooves is at least equal at all points to the thickness of the wall elsewhere.

Figure 9A:
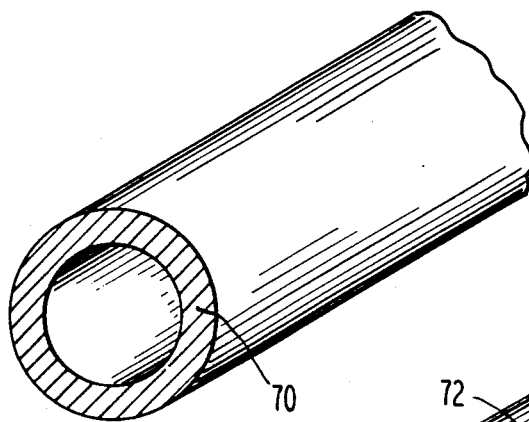
FIGS. 9a, 9b and 9c, shows successive stages in the forming of the tubes making up the telescoping torque transmitting coupling of the invention.
Figure 9B:
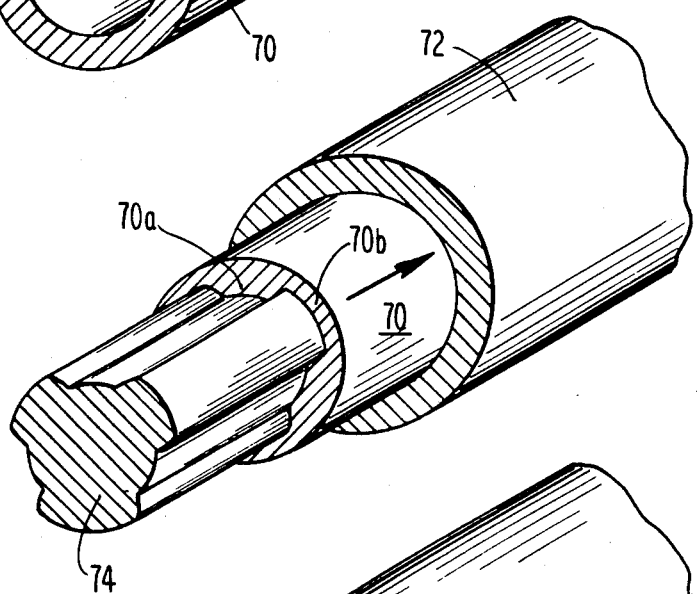
Figure 9C:
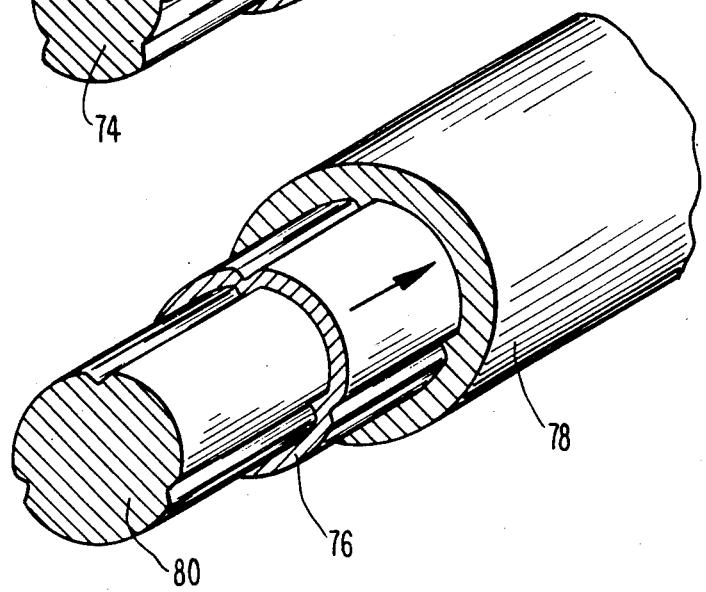

In order that the sharp corners can be fully developed and not rounded off during drawing, and so that the tubes are formed to sufficiently high standards of finish and of accuracy, to ensure proper fit, the best method of manufacture is simultaneous cold drawing, from a precursor having a non-uniform cross-section, through a die and over a mandrel. FIG. 9, which comprises FIGS. 9a through 9c shows how this can be done. Broadly speaking, both of the tubes making up the connection according to the invention are formed from the same starting material, a cylindrical tube of diameter generally about twice that of the finished tube. The tubes are drawn simultaneously through a die and over a mandrel in several steps to reach the final stage. In an intermediate stage the drawing takes the form of forming a cylindrical tube having a non-uniform inner surface, i.e., to form the non-uniform cross-section while preserving the circular outer diameter. Thereafter, the lobes are formed by dies forming the outer wall inwardly and controlling the inner shape with the mandrels, using the extra material formed in the intermediate step to form the wall thickness of non-uniform cross-section in the vicinity of the lobes.

Referring now to FIG. 9a, a precursor tube 70 is shown. This is a stock tube product. For the example given above in which the final outer tube is of 1.750" outside diameter and the inner tube is of 1.480" outside diameter, the precursor starting tubes 70 for both are substantially larger in diameter and have a heavier wall thickness; typically a 4.50" outside diameter by 0.25" wall thickness welded HSLA steel tubing can be used. This is drawn down conventionally in gradual stages until it reaches an intermediate diameter, at which time the operation shown schematically in FIG. 9b is shown. For example, as to the outer tube, this may occur when the outer diameter of the tube is 2.195" and has a 0.195" wall thickness. For the inner tube, this step may occur when the tube is at about 1.900" outer diameter and has a 0.190" wall thickness. As shown in FIG. 9b, the wall of the tube is "prethickened" in areas 70a so as to provide areas of increased wall thickness. In the preferred embodiment this is done instead by not reducing these portions of the tube wall while reducing others; material is effectively moved circumferentially around the tube from the thinner areas 70b to the thicker area 70a. This is done by drawing the tube 70 through one or more dies 72 over a like number of mandrels 74 having the appropriate shapes formed therein, which yields the tube 70 shown in FIG. 9b. Thereafter continued drawing operations are undergone, again through dies and over mandrels, culminating in the final version shown in FIG. 9c in which the tube 76 is formed to the contours shown in FIGS. 7 and 8, again by drawing down in a die 78 over a mandrel 80 which between them form the tube into its desired final shape. (It will be appreciated by those skilled in the art that the drawings of FIGS. 9b and c are shown exploded for clarity and that according to ordinary drawing practice, the deformation caused by the die and the mandrel would occur simultaneously; that is, the die and mandrel would be substantially aligned with one another, not spaced axially as shown in these drawings for clarity.)

It will be seen, therefore, that the method of the invention, involving prethickening of portions of the tube wall prior to final deformation of the tube to form the lobe design having flat interacting walls on inner and outer tubes, allows close-tolerance formation of these lobes with concomitant accuracy of the interacting surfaces and successful achievement of the objectives of the invention.

In this connection the prior art constructions of FIG. 3 and 5 do not apparently require prethickening, probably because the lobes in those designs are so big in relation to the overall size of the tube that flat surfaces of adequate width to allow telescoping under load without unreasonable end loading can be formed without adoption of this expedient. However, these big lobes greatly and undesirably depart from the circular shape. Moreover, these lobes extend outwardly, which while it may simplify the forming operation, complicates the connection to a U-joint yoke, and requires the yoke to be much more massive.

Those skilled in the art will recognize that there has been described an improved telescoping torque transmitting joint design and a method for manufacturing the tubing used to comprise the joint. While no objective test results are presently available, subjective tests indicate that the torque transmitting capability of the joint is more than adequate to meet the ASAE standard previously mentioned, while the ease of telescoping the connection under load is at least as good as any previously available design known to the applicants. No special lubricants or anti-friction coatings are required on the tubes to achieve this result. Similarly, durability of the connection, tested by performing a large number of telescoping cycles of under load, is at least comparable with anything now available. This is believed due, in part, to the smooth surfaces which are formed on the tubes by the drawing-over-mandrel process used to form the lobes and discussed in detail above. This process, leading as it does to very regular and accurately formed tubes, is very useful in the formation of the coacting flat surfaces on the lobes of the inner and outer tubes which is so important to adequate torque transmission capabilities without excessive end loading upon telescoping. The drawing process also serves to increase the surface hardness of the lobes, which also improves their durability. Formation of the specific cam lobes required by the invention requires that the tube wall not be simply drawn down in a process which continually reduces the wall thickness of the tube, which is the usual tendency of drawing operations, but instead that a drawing operation be carefully performed so as to selectively decrease the section of the tube, effectively "prethickening" the wall of the tube in the areas where the lobes are to be formed.

The telescoping tube design according to the invention retains most of the round cross-section of the precursor tube, which is desirable for reasons of strength and for convenience in attachment of the tubes of the invention to universal joint yokes and the like, and also allows use of conventional straightening equipment if needed after the drawing process.

While a preferred embodiment of the invention has been described above, this should not be taken to be a limitation on the scope of the invention, but merely as exemplary thereof. The invention is to be limited only by the following claims.

We claim:

1. The method of manufacture of a telescoping torque transmitting joint comprising inner and outer members slidable with respect to one another, said members comprising inner and outer cylindrical tubes having inwardly extending longitudinal lobes for mating with one another to permit transmission of torque from one member to the other, said mating portions of said lobes having mating surfaces shaped for interaction with one another, such that the mating surfaces of the inner wall of the outer tube and the outer wall of the inner tube have substantial width perpendicular to the length of said tube, wherein the wall thickness of said tube at the point said lobes begin to extend inwardly from the outer diameter of said tube to form said lobes is thicker that the wall thickness of said tubes at regions away from said lobes, comprising the steps of:

drawing a cylindrical tube simultaneously through a die and over a mandrel to form a precursor tube, said die having an inner cylindrical surface and said mandrel having external longitudinally extending grooves therein so that said tube wall is reduced by a different amount by said mandrel and said die at the regions of said mandrel having said grooves formed therein than at the regions of said mandrel not having said grooves formed therein so as to shape said precursor tube into an intermediate precursor tube having inwardly extending thickened wall portions in the regions at which said inwardly extending lobes are to be formed; and thereafter drawing said intermediate precursor tube simultaneously through a finishing die and over a finishing mandrel, said finishing die having an inner surface having external longitudinally extending projections corresponding in number to the number of lobes to be formed in said tube, said finishing mandrel having a corresponding number of external longitudinally extending grooves, said projections of said finishing die and said grooves of said finishing mandrel being aligned with said thickened wall portions of said intermediate precursor tube so that said finishing die and said finishing mandrel cooperate to produce within said thickened wall portions said inwardly extending lobes extending longitudinally along said tube.

2. The method of claim 1 wherein said mating surfaces are substantially flat across their width.

3. The method of claim 2 wherein the mating surfaces of each of said lobes form a Vee-shape symmetrical with respect to a line passing through the center of said lobe and the center of said tube.

4. The method of claim 3 wherein said Vee makes an angle of between about 60° and about 120°.

5. The method of claim 4 wherein said angle is substantially 90°.

6. The method of making a tube having a plurality of longitudinally extending grooves extending inwardly into said tube wherein the wall thickness of the tube portion forming each of said grooves is at least as thick as the wall of said tube in portions not forming said grooves, comprising the steps of:

drawing a precursor cylindrical tube simultaneously through a die having an inner cylindrical surface and over a mandrel, said mandrel having external longitudinally extending grooves therein so that said tube wall is reduced by a different amount by said mandrel and said die at the regions of said mandrel having said grooves formed therein than at the regions of said mandrel not having said grooves formed therein, whereby an intermediate precursor tube is generated having increased inwardly extending wall thickness at the portions of said precursor tube intended to receive said grooves, and thereafter drawing said intermediate precursor tube simultaneously through a second die and over a second mandrel, said second die having an inner surface having longitudinally extending projections corresponding in number to the number of grooves to be formed in said tube, said second mandrel having a corresponding number of external longitudinally extending grooves therein, said projections of said second die and said grooves of said second mandrel being aligned with said portions of increased wall thickness of said intermediate precursor tube to form said grooves in said tube within said increased wall thickness portions, each of said grooves having a wall thickness over its entire extent at least equal to the wall thickness of said tube in the area not including said grooves.

7. The method of claim 6 wherein the walls of each said groove in said tube have a width perpendicular to their length, the wall of each said groove in said tube being substantially flat over said width, whereby a substantially planar surface is formed on the walls of each said groove in said tube.

8. The method of claim 7 wherein said substantially planar surfaces are formed on symmetrically disposed walls of each said groove in aid tube whereby the wall of each said groove in said tube form a Vee angle with respect to one another.

9. The method of claim 8 whrein the Vee angle made by said walls is between about 60° and about 120°.

10. The method of claim 8 wherein the Vee angle made by the walls of each said groove in said tube is equal to about 90°.

11. The method of claim 7 wherein said tube having said groove formed there is sized to fit closely together with another tube having a corresponding number of grooves made similarly, such that torque may be transmitted from one tube to another by interaction of the walls of the grooves of one tube and the walls formed on the corresponding grooves of the other tube, while said members may be telescoped slidingly with respect to one another.

12. The method of claim 6 wherein the overall cross-section of said tube after having said grooves formed therein is substantially round.

* * * * *